(12) United States Patent
Cherrix et al.

(10) Patent No.: US 8,184,894 B1
(45) Date of Patent: May 22, 2012

(54) ELECTRONIC REASSOCIATION

(75) Inventors: Coty T. Cherrix, Atlanta, GA (US);
Orlando O. Atienza, Charlotte, MD (US); Robert B. Walker, Waxhaw, NC (US); Kristan C. Densmore, St. Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 750 days.

(21) Appl. No.: 12/277,351

(22) Filed: Nov. 25, 2008

(51) Int. Cl.
*G06K 9/00* (2006.01)
*G06Q 40/00* (2012.01)

(52) U.S. Cl. ............... 382/137; 382/305; 705/35

(58) Field of Classification Search ............ 382/100, 382/101, 112–115, 135–140, 155, 168, 173–177, 382/181–188, 197–202, 209, 224, 232, 254, 382/274, 276, 312, 317–321, 305; 705/45, 705/35, 64; 270/52.01
See application file for complete search history.

(56) References Cited

U.S. PATENT DOCUMENTS

| 7,386,511 | B2 * | 6/2008 | Buchanan et al. | 705/45 |
|---|---|---|---|---|
| 7,660,771 | B2 * | 2/2010 | Orcutt | 705/64 |
| 7,720,735 | B2 * | 5/2010 | Anderson et al. | 705/35 |
| 7,882,003 | B2 * | 2/2011 | Anderson et al. | 705/35 |
| 7,992,853 | B2 * | 8/2011 | Hayduchok et al. | 270/52.01 |
| 7,996,317 | B1 * | 8/2011 | Gurz | 705/45 |
| 8,027,928 | B1 * | 9/2011 | Hecht et al. | 705/64 |
| 8,045,784 | B2 * | 10/2011 | Price et al. | 382/137 |

OTHER PUBLICATIONS http://www.metavante.com/mvnt/corp/whyicamehere?m=22558&p=20643 retrieved on Nov. 26, 2008.
http://banking.about.com/od/businessbanking/a/lockboxes.htm retrieved on Nov. 26, 2008.

* cited by examiner

*Primary Examiner* — Seyed Azarian
(74) *Attorney, Agent, or Firm* — Weiss & Arons LLP; Michael Springs

(57) ABSTRACT

Apparatus and methods for providing electronic reassociation of data transmissions of checks and backup information. A method according to the invention may include scanning each check received by a lockbox service and scanning backup information related to correspondence included with each check. Thereafter, the method may include electronically associating each check with the backup information. The method may include generating a data transmission for each check and the associated backup information. Finally, the method may include storing the data transmission for each check and the associated backup information at a periodic interval. Such an interval may be determined, at least in part, by the deposit cut-off time of a financial institution.

18 Claims, 3 Drawing Sheets

ELECTRONIC REASSOCIATION

FIELD OF TECHNOLOGY

Aspects of the disclosure relate to check image processing.

BACKGROUND

When customers send a check, these payments must be deposited into a bank so that the check payee can use the money. Lockbox services allow organizations to streamline receipt and processing of mailed items; especially checks.

There are a variety of lockbox services available: wholesale lockboxes, retail lockboxes and other, custom-designed lockbox programs.

The primary advantage of lockbox services is speed and efficiency of mail processing. Lockbox services get money into a bank account faster than an entity can typically do it by itself. For example, certain lockboxes may be located in places where the mail is delivered several times per day whereas an entity may only receive mail once each day. Thus, lockboxes offer more opportunities to capture payments and make deposits to an entity's account.

Most importantly, a lockbox reduces the amount of time it takes for money to be transferred to the entity's accounts. Accordingly, the entity has less outstanding "float" money—i.e., customer payments get deposited and become available for use as quickly as possible.

Currently, employees of certain lockbox services manually take physical copies of check images and attach the copies to printed back-up information required for the processing of the check images.

During this process the employees have to use an artificially created audit trail to match and compare which electronic check images should be attached to the appropriate back-up physical document. Then, the employees print the check images, bundle the check images with the physical back-up, and either mail through first-class US Mail or U.S. Express Mail to the appropriate location.

It would be desirable to provide systems and methods for improving the processing of check images by lock box services.

SUMMARY OF THE INVENTION

It is an object of this invention to provide systems and methods for improving the processing of check images by lock box services.

A method for electronically processing checks and associated backup information is provided. The method may use an electronic information processing platform. The method and/or process may further include using the electronic information processing platform to scan each check received by a lockbox service. Then, the method may include using the electronic information processing platform to scan backup information related to correspondence included with each check. The method may further include electronically associating each check with the backup information. The method may include using the electronic information processing platform to generate a data transmission corresponding to each check and the associated backup information. The method may also include storing the data transmission for each check and the associated backup information at a periodic interval determined, at least in part, by the deposit cut-off time of a financial institution. Alternatively, the storing step may occur at some other pre-determined, but preferably periodic, time.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The central idea of the invention is to migrate reassociation of output from a known lockbox platform to a printing center at predetermined intervals. Preferably, the migration may be based on the mail-out zip code of each of the pieces of mail. Alternatively, the migration may be converted to a data transmission for access capabilities by the client. The data transmission may include the images of the checks and backup information associated therewith.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
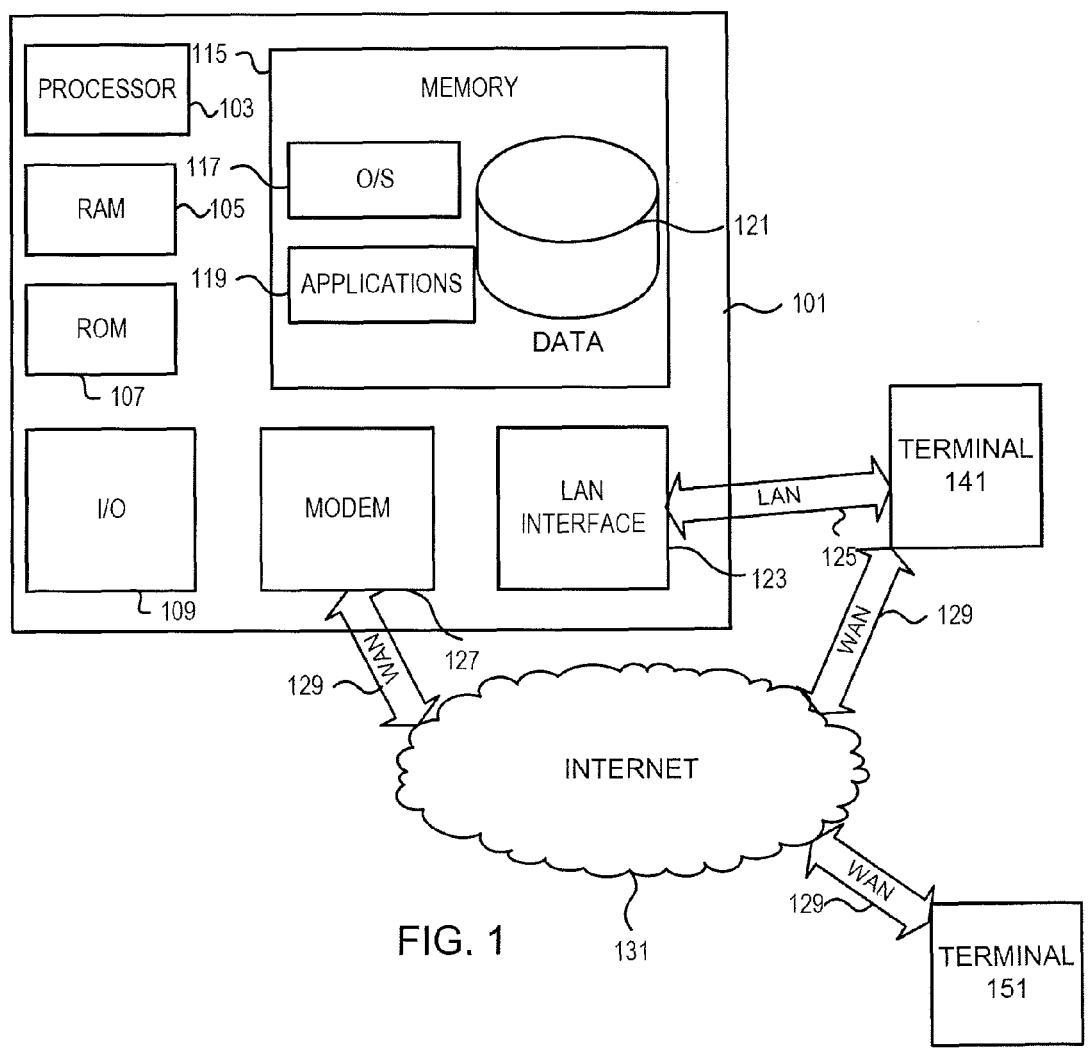
FIG. 1 is a schematic diagram of apparatus that may be used in accordance with the principles of the invention.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide storage for account information, account holder information, and/or any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
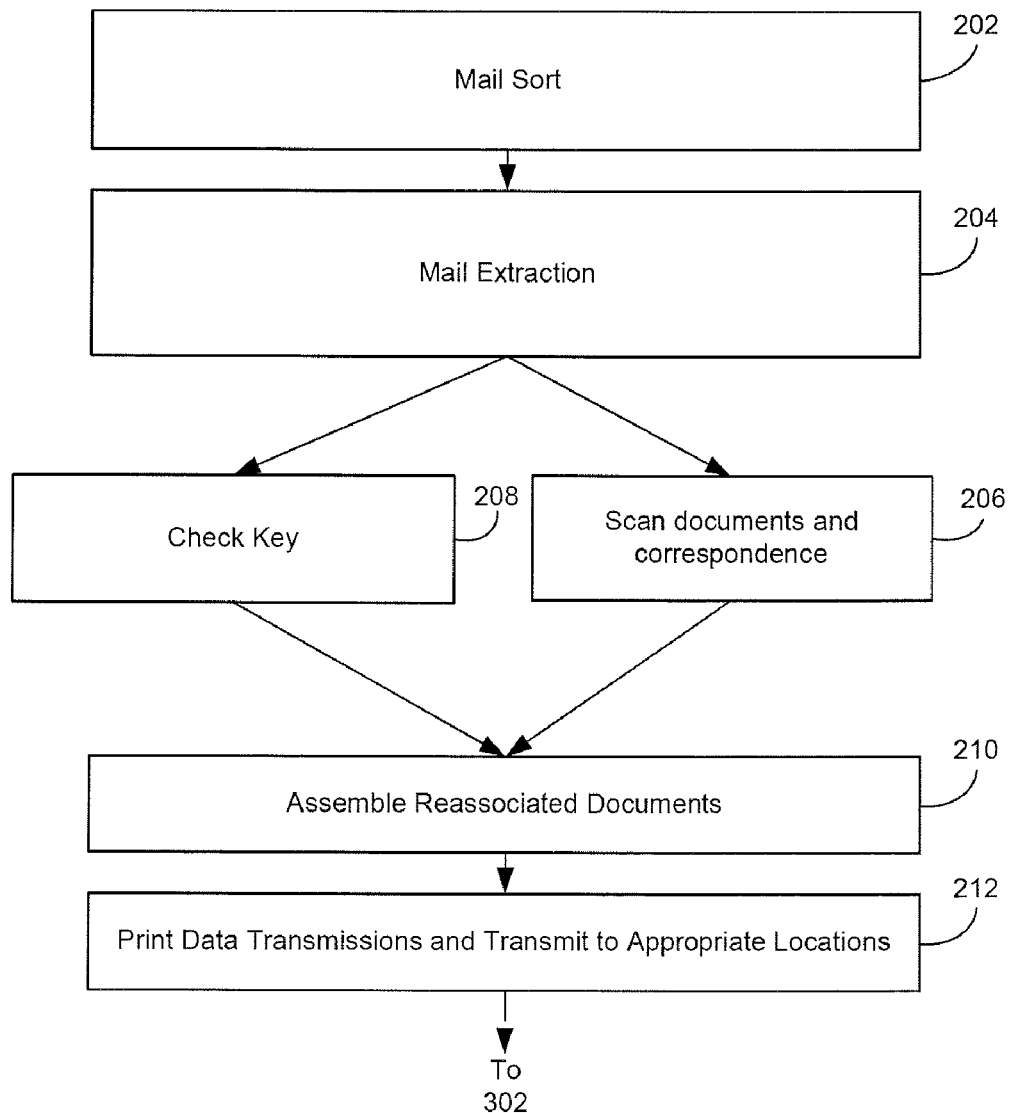
FIG. 2 is a flow diagram that shows a process according to the invention.

FIG. 2 shows a flow diagram that illustrates a process according to the invention that may be implemented at least in part on the apparatus shown in FIG. 1. Steps 202 and 204 show sorting the incoming mail and extracting relevant paper from the incoming mail, respectively.

Step 206 shows scanning documents and correspondence—i.e., backup information—that accompanies mailed checks. The backup information may include an associated stub with account identification. Step 208 shows obtaining information for each individual check.

Step 210 shows using a system such as the Vicor™ system (platform) produced by Vicor/Metavante of Richmond, Calif., to assemble reassociated checks and backup items.

Step 212 shows printing data transmissions that include the reassociated checks and backup information and mailing the data transmissions to the appropriate locations for further processing.

Figure 3:
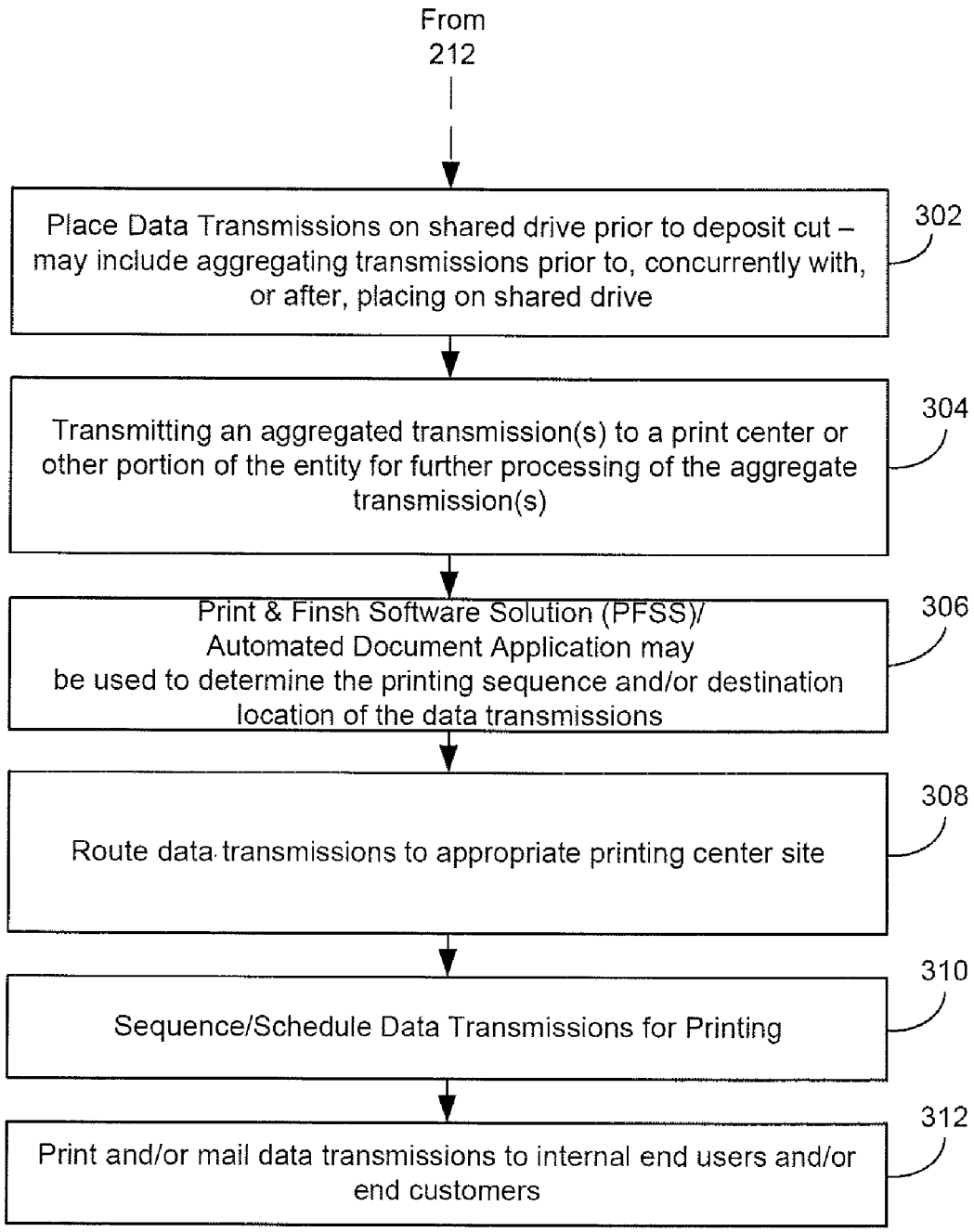
FIG. 3 is a flow diagram that shows a process in accordance with the principles of the invention.

FIG. 3 shows an illustrative flow diagram that illustrates a process according to the invention that may be implemented at least in part on the apparatus shown in FIG. 1. It should be noted that the process shown in FIG. 3 may continue from step 212 of the process shown in FIG. 2.

Step 302 shows initiation of a process according to the invention. The process may store image data transmissions of checks that have been reassociated with electronic images of backup information on a shared drive.

Such storing may occur at pre-determined intervals. Such intervals may be defined by the occurrence of deposit cut-off times for a financial institution. Thus, at, or before or after, each deposit cut-off time, an aggregation of preferably all received checks and associated backup information that were registered since the preceding deposit cut-off time may be stored separately, or as an aggregated data transmission, on a shared drive.

Step 304 shows, following the deposit cut-off time (or, alternatively, following the periodic storing of the aggregation of checks and backup information on the shared data transmission), transmitting an aggregated data transmission (s) to a print center or other portion of the entity for further processing of the aggregate data transmissions.

In step 306, print and finish software and/or automated document software may be used to determine the printing sequence and/or destination of the data transmission(s). Thereafter, step 308 shows routing the data transmission(s) to the appropriate printing center location. Step 310 shows sequencing and/or scheduling the data transmission (s) for printing at one or more of the respective printing centers. Finally, step 312 shows printing and delivering data transmission(s) to the internal entity recipients of the data transmission(s) and/or end customers of the data transmission(s).

Aspects of the invention have been described in terms of illustrative embodiments thereof. A person having ordinary skill in the art will appreciate that numerous additional embodiments, modifications, and variations may exist that remain within the scope and spirit of the invention.

One of ordinary skill in the art will appreciate that the apparatus features described herein and illustrated in the FIGS. may be arranged in other than the recited configuration and that one or more of the features may be optional. Also, the methods described herein and illustrated in the FIGS. may be performed in other than the recited order and that one or more steps illustrated may be optional. The above-referenced embodiments may involve the use of other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for improving the processing of check images and associated backup information by lockbox services have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for electronically processing checks and associated backup information, the method using an electronic information processing platform, the method comprising:

using the electronic information processing platform to scan and process check information for each check received by a lockbox service;

using a scanning device to separately create a scanned image of backup correspondence information, the backup correspondence information related to correspondence included with each check;

electronically reassociating the scanned image of backup correspondence information with the check information;

using the electronic information processing platform to generate a data transmission for the check information and the reassociated scanned image of backup correspondence information;

using the electronic information processing platform to aggregate a plurality of image data transmissions; and storing the plurality of image data transmissions at a periodic interval determined, at least in part, by the deposit cut-off time of a financial institution.

2. The method of claim 1 further comprising using the electronic information processing platform to determine a printing sequence of the plurality of data transmissions.

3. The method of claim 1 further comprising using the electronic information processing platform to determine the destination for each of the data transmission.

4. The method of claim 3 further comprising using the electronic information processing platform to route each data transmission to the determined destination.

5. The method of claim 3 further comprising using the electronic information processing platform to schedule each of the data transmission for printing at the determined destination.

6. The method of claim 5 further comprising using the electronic information processing platform to print each of the data transmissions at the determined destination.

7. A computer-readable medium storing computer-executable instructions which, when executed by a processor on a computer system, perform a method for electronically processing checks and associated backup information, the method comprising:

scanning and processing check information for each check received by a lockbox service;

separately creating a scanned image of backup correspondence information, said backup correspondence information recorded on correspondence received with each check;

electronically reassociating the scanned image of backup correspondence information with the check information;

generating a data transmission for the check information and the reassociated scanned image of backup correspondence information;

aggregating a plurality of image data transmissions; and storing the plurality of image data transmissions at a periodic interval determined, at least in part, by the deposit cut-off time of a financial institution.

8. The method of claim 7 further comprising determining a printing sequence of the plurality of data transmissions.

9. The method of claim 7 further comprising determining the destination for each of the data transmissions.

10. The method of claim 9 further comprising routing each of the data transmissions to the determined destination.

11. The method of claim 9 further comprising scheduling each of the data transmissions for printing at the determined destination.

12. The method of claim 11 further comprising printing each of the data transmissions at the determined destination.

13. A method for electronically processing checks and associated backup information, the method using an electronic information processing platform, the method comprising:

using the electronic information processing platform to scan and process check information received by a lockbox service;

using a scanning device to transform printed backup correspondence information related to correspondence included with each check into an electronic data transmission;

electronically reassociating the check information with the electronic data transmission;

using the electronic information processing platform to generate a data transmission for the check information and the associated electronic backup correspondence information;

using the electronic information processing platform to aggregate a plurality of data transmissions; and storing the plurality of data transmissions at a periodic interval determined, at least in part, by the deposit cut-off time of a financial institution.

14. The method of claim 13 further comprising using the electronic information processing platform to determine a printing sequence of the plurality of data transmissions.

15. The method of claim 13 further comprising using the electronic information processing platform to determine the destination for an aggregation of the plurality of data transmissions.

16. The method of claim 15 further comprising using the electronic information processing platform to route the aggregated data transmission to the determined destination.

17. The method of claim 15 further comprising using the electronic information processing platform to schedule printing of the aggregated data transmission at the determined destination.

18. The method of claim 17 further comprising using the electronic information processing platform to print the aggregated data transmission at the determined destination.

* * * * *